(12) United States Patent
Wong

(10) Patent No.: US 6,690,351 B1
(45) Date of Patent: Feb. 10, 2004

(54) COMPUTER DISPLAY OPTIMIZER

(75) Inventor: Andrew Wong, Bethesda, MD (US)

(73) Assignee: Xybernaut Corporation, Fairfax, VA (US)

( * ) Notice: Subject to any disclaimer, the term of this patent is extended or adjusted under 35 U.S.C. 154(b) by 0 days.

(21) Appl. No.: 09/544,037

(22) Filed: Apr. 6, 2000

(51) Int. Cl.$^7$ ................................................ G09G 5/00
(52) U.S. Cl. .......................... 345/156; 345/8; 345/207
(58) Field of Search ................................ 345/156, 7, 8, 345/207, 690

(56) References Cited

U.S. PATENT DOCUMENTS

| | | | | |
|---|---|---|---|---|
| 4,342,023 A | * | 7/1982 | Tsunoda et al. ............ 340/460 |
| 4,997,263 A | * | 3/1991 | Cohen et al. ................. 349/11 |
| 5,117,148 A | * | 5/1992 | Nakamura et al. .......... 310/367 |
| 5,314,391 A | * | 5/1994 | Potash et al. .................. 482/7 |
| 5,485,172 A | * | 1/1996 | Sawachika et al. ............. 345/8 |
| 5,844,824 A | * | 12/1998 | Newman et al. ............. 345/156 |
| 6,002,386 A | * | 12/1999 | Gu .............................. 345/690 |
| 6,094,185 A | * | 7/2000 | Shirriff ....................... 345/102 |
| 6,204,974 B1 | * | 3/2001 | Spitzer ........................ 359/630 |
| 6,285,757 B1 | * | 9/2001 | Carroll et al. ............... 345/619 |
| 6,466,232 B1 | * | 10/2002 | Newell et al. ............... 345/700 |

* cited by examiner

Primary Examiner—Dennis-Doon Chow
(74) Attorney, Agent, or Firm—James J. Ralabate

(57) ABSTRACT

In this invention, a sensor is placed in the computer system or sometimes in the display to optimize the display figures. Various types of sensors are used to measure ambient conditions and the user specifications and requirements.

17 Claims, 4 Drawing Sheets

MEMSDO block diagram

COMPUTER DISPLAY OPTIMIZER

This invention relates to computer displays and, more specifically, to a system for optimizing internal settings based on sensor information of the displays surrounding environment.

BACKGROUND OF THE INVENTION

It is known to use hands-free activated user supported computers such as the type disclosed in U.S. Pat. Nos. 5,305,244 and 5,844,824. In these two patents a user supported (sometimes wearable) computer is disclosed where the display means is supported by the user. The compact computer disclosed in these two patents comprises a user supported computer housing having storage means mounted in the computer housing for storing previously entered information. The processor means is located in the housing for receiving, retrieving and processing information and converter means in communication with the processor means for receiving and converting the received information into electrical signals. The processor means will recognize the commands and transmit this information to a user supported computer display means. The disclosures of U.S. Pat. No. 5,305,244 (Newman I) and U.S. Pat. No. 5,844,824 (Newman II) are incorporated by reference into the present disclosure.

The requirements of a mobile display means supported by a user are completely different from the display means of a stationary computer such as a desk top computer. The desk top computer is maintained at the same location, therefore the environment in which it is used very rarely, if ever, changes. By contrast, in a user supported, mobile and hands-free computer, the environment of use is constantly changing and requiring a more versatile display, viewable in many, many different environments. For example, in a user supported computer including wearable computers, it is not uncommon to use the same computer in broad daylight, outdoors, or indoors in darkness, in cold and hot locations and in environments that are constantly changing. Therefore, one could not logically equate the stationary display requirements to those of the mobile, hands free user supported computer. While throughout this disclosure and claims, the present invention will be described in relation to a user supported (sometimes wearable) computer that is hands free activated, it should be understood that the presently described display system may be used in any suitable situation requiring enhanced electronic display performance. Thus, the purpose of the present invention is to provide users with output devices or displays that automatically optimize internal settings based on sensor information of its surrounding environment. The system presently used may be broadly defined as a microelectromechanical system which will be referred throughout this disclosure as "MEMS" and "MEMSDO" will indicate the device output of"MEMS".

It is known in the computer art to provide some display optimizing or enhancing means to various computer systems such as CRT's. Some of these are disclosed in U.S. Pat. No. 5,670,985 (Cappels, et al), U.S. Pat. No. 5,760,760 (Helms); U.S. Pat. No. 5,850,205 (Blouin); U.S. Pat. No. 5,910,653 (Compo); U.S. Pat. No. 5,933,130 (Wagner); and U.S. Pat. No. 6,002,386 (Gu). None of these prior art patents disclose the use of display enhancements in a mobile hands free computer system.

Cappels (U.S. Pat. No. 5,670,985) is directed towards a system used in stationary computers such as Quadra 800 from Apple Computer, Inc. for de-compensating the output of an output device to eliminate reflected ambient illumination. It comprises a display device, a calibration memory, a reflectivity memory, a memory, a processor, an input device, a video card, and an achromatic card that serves as a standard for comparison to the output of the output device. This system adjusts the output of the display to match the ambient illumination reflected from the achromatic card. Using the known tristimulus values of the output generated by the output device and the known reflectivity characteristics of the glass and inside coatings of the front glass plate and the card, the processor calculates the hue and intensity of the ambient illumination Cappels' invention is limited in that the input sensor does not do the following: 1) measure ambient temperature, 2) use a time of day as an input factor, 3) take into consideration the software application in use, 4) take operator characteristics input (distance from output display and corrected or uncorrected vision), and 5) measure ambient noise.

Gu (U.S. Pat. No. 6,002,386) teaches an automatic contrast control circuit for a display device. The system includes a distance detector installed on a front panel of the display device, for detecting a distance existing between a user and the front panel. The result is that the contrast of the display device is controlled automatically, depending on the proximity of the user to the display screen to offer enhanced eye protection.

Gu's invention differs from that disclosed by the instant application in that it utilizes a distance detector as its only means of input data and only uses the information to adjust the contrast setting. The MEMS Digital Optimizer uses significantly more input data than simply distance and generates computer commands for the output device beyond simply contrast settings.

Wagner (U.S. Pat. No. 5,933,130) teaches an anti-eye strain apparatus and method which automatically adjusts the brightness of a display to cause the muscles of the eyes of the user to adjust and refocus such that eye fatigue or tiredness is reduced or eliminated. The brightness is varied within a particular range and the brightness within this range is occasionally or periodically adjusted.

The changing brightness follows a predetermined pattern or cycle. The brightness may be adjusted electronically or mechanically by an application or software, or by changing the palette of colors or the gray scale.

Wagner differs from the present invention in that it sets brightness of the LCD or CRT using a predetermined pattern or cycle. The MEMS Digital Optimizer does not use any preset pattern or cycle. In addition, MEMSDO generates computer commands to the output device for more than the brightness setting. MEMSDO is also expected to be used with holographic output displays as well as traditional LCD and CRT displays used with computers.

Campo (U.S. Pat. No. 5,910,653) teaches an electronic shelf tag including a display device which includes an optical device and an ambient light detector circuitry. The electronic shelf display device senses the current ambient lighting conditions and controls its power state based on the current ambient lighting conditions. The general purpose is to power down in low light when the retail outlet is presumably closed and to operate in normal mode when ambient light is high and the retail outlet is presumably open.

Campo's patent has similar differences over the instant application as Cappels'. Campo seeks to only measure ambient light. As with Cappels, the input sensor does not do the following: 1) measure ambient temperature, 2) use a time of day as an input factor, 3) take into consideration the software application in use, 4) operator characteristics (distance from output display and corrected or uncorrected vision), and 5) measure ambient noise.

Blouin (U.S. Pat. No. 5,850,205) teaches an LCD with automatic contrast control. A light sensor is mounted over a test pixel which is separate from the main viewing area of the LCD for taking luminance measurements for "ON" and "OFF" and "surround" pixel states for a series of candidate operating voltages. The pixel contrast ratio and background contrast ratios are computed for each candidate voltage and the voltage resulting in the best contrast is selected as the operating voltage for the entire LCD. Blouin anticipates effects of temperature on LCD fluids and thus realizes need to adjust optimal contrast in response to these affects.

Blouin's patent only describes measuring luminance and only addresses adjusting pixel. The application is only targeted for LCDs. Again the differences over the instant application are similar to the Cappels and Campo patents.

Helms (U.S. Pat. No. 5,760,760) teaches method and apparatus for adjusting the brightness level of an LCD based on the ambient lighting conditions of the environment in which the LCD is being operated. A photo detector on the front of the LCD generates to brightness control circuitry signals indicative of ambient lighting conditions. The main purpose of Helms is to maximize battery life by decreasing brightness of the LCD whenever ambient lighting conditions permit and then subsequently increasing the brightness level only when necessitated by bright ambient lighting conditions.

The difference between Helms (U.S. Pat. No. 5,760,760) and the instant application are similar to that of Cappels and the instant application. Same arguments as with Cappels. Also the "artificial intelligence" alluded to is not specific enough to encompass the MEMSDO capability of measuring the vision of the operator using a laser driven auto refractor and keratometer.

Therefore, there is a need to have a display optimizer which compensates for the known disadvantages and deficiencies of the prior art teachings; a system which could meet all the limitations taught by said prior art system and add additional unexpected functionality to extend to different display devices and to scan and calculate environmental and operator characteristics to be used to dynamically optimize an output display.

SUMMARY OF THE INVENTION AND PREFERRED EMBODIMENTS

It is therefore an object of this invention to provide a display system devoid of the above noted disadvantages.

Another object of this invention it to provide an enhanced computer display having a unique use in a mobile, hands free computer system.

Still a further object of this invention is to provide a MEMS system for optimizing display through the use of various ambient environmental and user derived sensing and feedback equipment.

Yet another object of this invention is to provide the user of a hands free mobile computer with a display means that can be used indoors and outdoors in a variety of changing conditions.

Another still further object of this invention is to provide a unique display means that compensates for most negative environments and provides the user with a much more versatile display means.

Still yet another object of this invention is to provide a sensor capacity in a mobile display that will change as the location of the user changes.

These and other objects of this invention are accomplished, generally speaking, by a display means that will automatically optimize internal settings based on sensor information of its surrounding environment.

The present invention overcomes the limitations of the prior art teachings with a microelectromechanical system (MEMS) for optimizing display in hands free computer systems through the use of various ambient environmental and user derived sensing and feedback equipment.

The device may be broadly defined as a microelectromechanical system which has: 1) a sensing or data acquisition function; 2) a data processing function; and 3) a computer command function. The purpose of the MEMS is to scan and calculate environmental and operator characteristics to be used to optimize an output display (computer flat panel, neck hung, head mounted display, or other operator supported display that can be using cathode ray tube (CRT), liquid crystal display (LCD), or holographic display technologies) by setting the appropriate illumination, colors, resolution, pixels, contrast, magnification (for monocular and binocular displays), volume and power usage of the output device The purpose of this invention is to provide users with output devices that optimize internal computer output settings based on sensor information of the operator and its surrounding environment. The sensor will determine the minimum power required to operate in any given mode in order to maximize battery life of battery powered output devices while maintaining operator viewability. Power savings may be gained by optimum configuration of pixels to maximize clarity at the lowest power draw. The measurements will be performed repeatedly with corresponding adjustments while the output device is being operated.

The sensor can be connected either by physical connector or by wireless radio frequency communications.

The computer commands generated from the data processing of sensing data include: 1) color settings based on time of day and operator vision; 2) optical magnification for corrected or uncorrected vision; 3) contrast settings based on ambient light, temperature and time of day; 4) brightness and illumination based on ambient light, temperature and time of day; 5) resolution and pixel settings based on ambient light, temperature and time of day; 6) volume adjustment on ear piece/speakers based on ambient noise; and 7) optimized power settings for minimum power draw and longer battery life while maintaining operator view ability.

For clarification by example, the MMD will factor in the color with the most appropriate wavelength that the operator's eyes can see most clearly. The inputs include time of day, external light source, power usage requirements, and software application.

For example, the color yellow is the most visible color to the human eye during daytime hours as the wavelength is equal to the length of a corrected 20/20 eye, resulting in the focal point of the yellow light meeting at the retina. During the course of a day, the pupil will change its size and the optimum color moves toward the red wavelength. The device will have a laser driven auto refractor/keratometer to measure the operator's vision and use the information as a data input. The data processing function of this device will take all these factors into consideration in generating the appropriate computer commands.

The device of the instant application is ideally constructed from known commercially available sensors integrated with existing computer equipment to achieve the unexpected results of this invention. Several well known commercial devices are utilizing the technology incorporated in the disclosure of the instant invention, though not in the same combination nor for the same purpose. For example:

1) Automatic Cameras: An automatic camera has a photo-sensitive electronic "eye" which is used to measure the external light. This sensor takes the information and uses it for making camera settings such as shutter speed that will result in clearer pictures.
2) Television Remote Control: Panasonic sells a remote control that has a "night" button on it. The button is pressed while watching television during nighttime viewing. The result is a picture that is optimized for clarity and resolution.
3) "Smart Organs": A device can be implanted into a living organism that will regulate the insulin of diabetics. The device is comprised of: a) an insulin sensor, b) insulin, and c) an insulin regulator.
4) Auto Refractor/Keratometer: Using a device incorporating the features of a product produced by Western Opthalmics, the sensor will be able to measure the corrected or uncorrected vision of the operator. The process described as auto keratometer or auto refractor incorporates a "hands free" alignment and image processing technology.
5) Distance Sensor: Motorola has a device that can measure distances using ultrasonic sound waves. The device emits an electric pulse sent by a microcontroller that causes a transmitting transducer to vibrate and generate a voltage upon receiving the echo signal. Distance is calculated using these two inputs.

The major MEMSDO sub-systems are: 1) Input Sensors; 2) Computer data processor; 3) Computer Commands; and 4) Output Device.

The environment and operator sensor component is an integrated device incorporating sensor data capture capabilities that acquire ambient temperature, light sensitive photodetector, ambient noise, distance of output device from eyes of operator, and automatic refractor and keratometer measurements of operator vision.

The operator hardware input provides information on the computing device that is in use by the operator. It detects the type of output device, the software application in use and the reflectivity characteristics of the physical glass and coatings of the output device such as flat panel display, bead mounted device, body mounted display, neck hung display, or holographic display.

The embedded database provides information on human circadian color recognition and time of day.

The computer data processor takes all the input data from the sensor components and calculates the optimal display setting and affects these settings on the display device with dynamic feedback and update capabilities.

Since each MEMSDO sub-system requires a microprocessor for carrying out its subsystem function, a more technically elegant design may be to use one central microprocessor and only keep the specialized functions within the sub-component.

The information compiled by the data processor is used to generate specific computer commands to the output device with the purpose of optimizing the view ability for the operator in a dynamic manner.

In addition to the hands free voice activation means used in Newman et al I as noted earlier, two other activation means disclosed in U.S. Pat. No. 5,844,824 have been contemplated by the present invention, i.e. eye-tracking and brain activation means (EEG). Using the same general system described in Newman et al I, voice activation may be fully or partially replaced by or used with either eye-tracking means and/or by brain activated technology means. In some situations, any combination of voice activation means, eye-tracking activation means and brain-activation means may be desirable in a Newman et al I type portable, hands free computer system. In combination with the above activation means some computing environments may utilize head and arm tracking means, for example, such as environment could be a virtual reality application. A fuller description of these hands free activation means is disclosed in Newman II, U.S. Pat. No. 5,844,824.

A further feature of an embodiment of the present invention utilizes an adapter used in each mobile computer to permit the use therein of cellular or hardwire telephone communication. In place of the cellular telephone communication means, a radiofrequency, infrared, laser or fiberoptic transceiver or other communication means may be used. These will generally be referred to in this disclosure as "communication means". Communication means can be accessed through the host computer or by using the display with its built-in communication capability.

The basic system incorporates the apparatus in one embodiment of this invention, i.e. hands free body worn computer with voice activation and a head-mounted display, a telephone system and a unique electronic interface between the two that integrates both traditional analog voice signals and computer data between the two components. Integration of private as well as public telephone communications into this system is accomplished using a voice data modem (modulator/demodulator) as now used with existing computing systems.

Those having ordinary skill in the art will appreciate that the display screen and display screen drive module can be implemented using any video technology either available presently or in the future, such as color graphics adapter (CGA), and enhanced graphics adapter (EGA), video graphics array (VGA), and super VGA. According to a present embodiment, however, the display screen and display screen drive module are implemented using well known monochrome and color video graphic array (VGA) technology. VGA eyepiece monitors are available from Kopin of Taunton, Mass., which produces and sell the AMLCD monitor. VGA eyepieces can operate using thin film transistors (TFT) in a matrix providing color or monochrome computer display. Such devices are manufactured for the industry and are well known to those in the art.

The, as earlier noted, inputs to this MEMS includes: 1) the environment (brightness and light source); 2) time of day; and 3) application being displayed. The optimization of the output display involves among other things, adjustments to the optics, and human eye and brain recognition of certain wavelengths within the color spectrum. The MEMS will take all these factors into consideration.

The purpose is to provide users with output devices that automatically optimize internal settings based on sensor information of its surrounding environment. One embodiment of the invention is a flat panel display that will automatically reconfigure its brightness and color settings dependent on whether it is outdoors or indoors, and time of day. Just as important, the sensor will determine the minimum power required to operate in any given mode in order to maximize battery life of battery powered output devices. Power savings may be gained by optimum configuration of pixels to maximize clarity at the lowest power draw.

The sensor can be either mounted: a) on the output device; b) on the user's body; c) anywhere in the computer system, or d) on another object in the environment where the output display is being used. The sensor can be connected either by physical connector or be wireless radio frequency communications.

DETAILED DESCRIPTION OF THE DRAWING AND PREFERRED EMBODIMENTS

Figure 1:
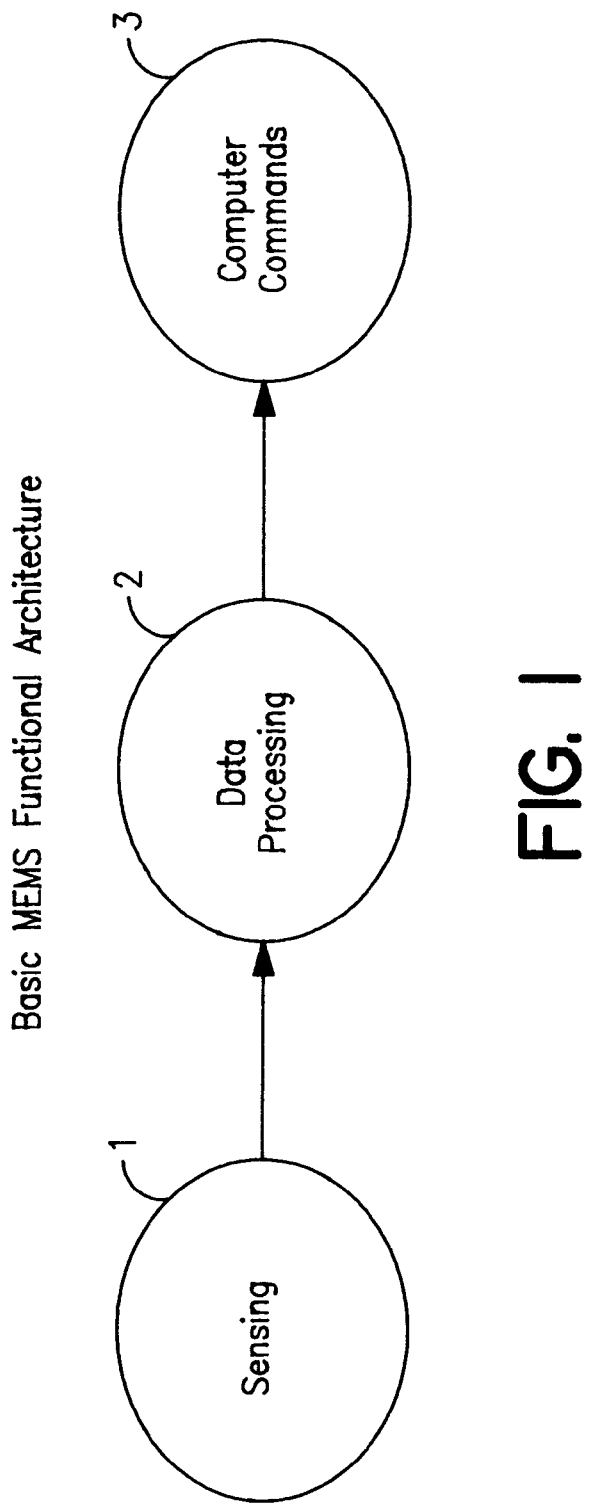
FIG. 1 is a flow diagram showing the steps in the system of this invention.

In FIG. 1 the sensor or sensing means hardware 1 which initiates the process of this invention is shown. This hardware 1 sends information on ambient conditions as well as user specific information to the computer data processing unit 2. The data processing unit 2 translates this data into computer commands 3 to effect command level control of the display system to effect the changes resulting from the sensor 1 input. The inputs as noted earlier include time of day, specific user needs, external light source, power usage requirements and software application. The user can also input his or her specific visual characteristics if desired.

Figure 2:
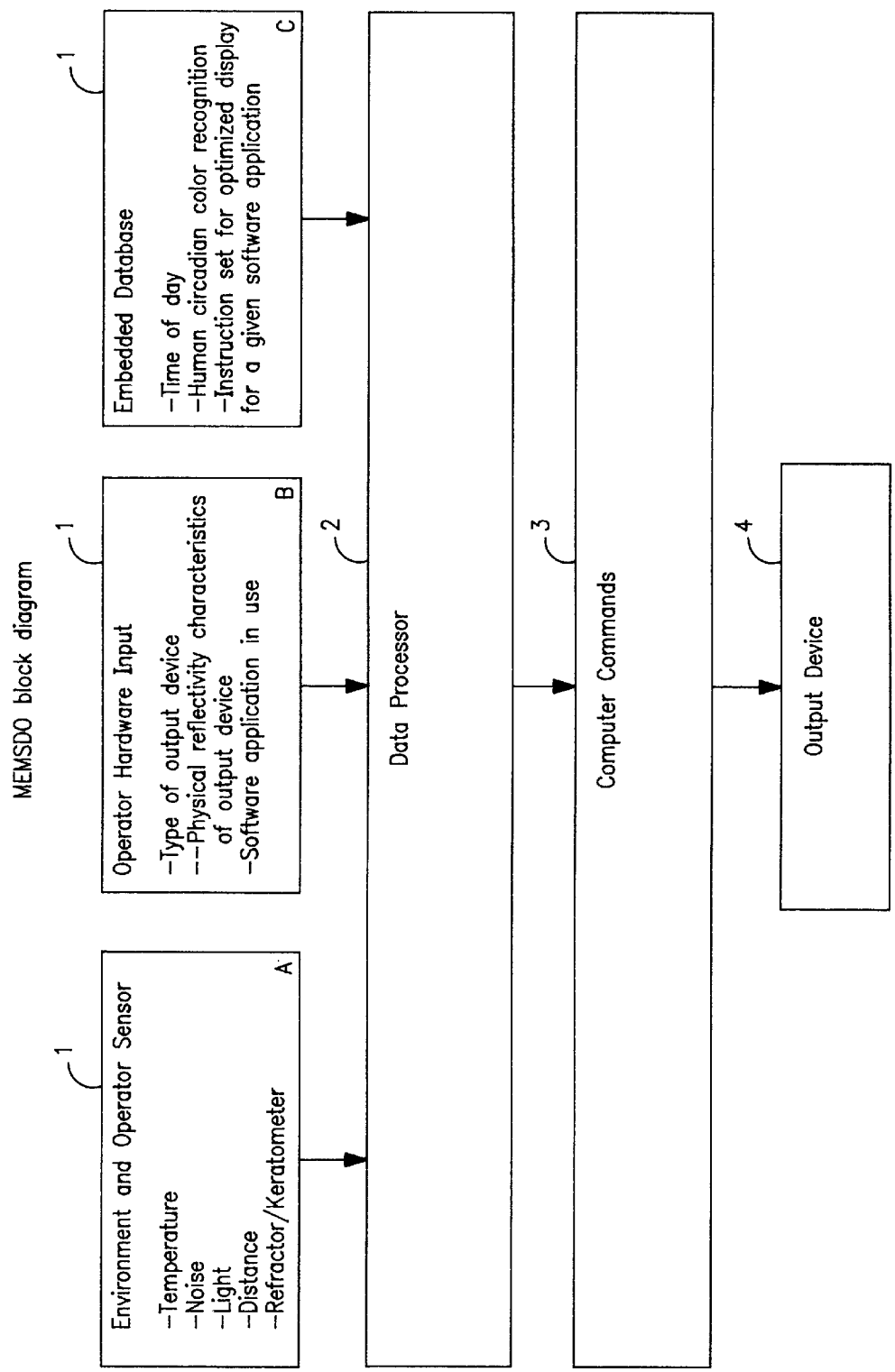
FIG. 2 is a block diagram (MEMSDO) showing the items that can be sensed by the sensor in the display means of this invention.

In FIG. 2, the input sensor 1, data processor 2, computer commands block 3, and output device 4 are shown. The environment and operator sensor 1 component is an integrated device in the display (or in another component of the mobile computer systems) incorporating sensor data capture capabilities that acquire ambient temperature, light sensitive photo detector, ambient noise, distance of output device from eyes of operator, and automatic refractor and keratometer measurements of operator vision. The three boxes A, B and C make up the sensor and indicate the capabilities of the sensor 1 within each block.

Figure 3:
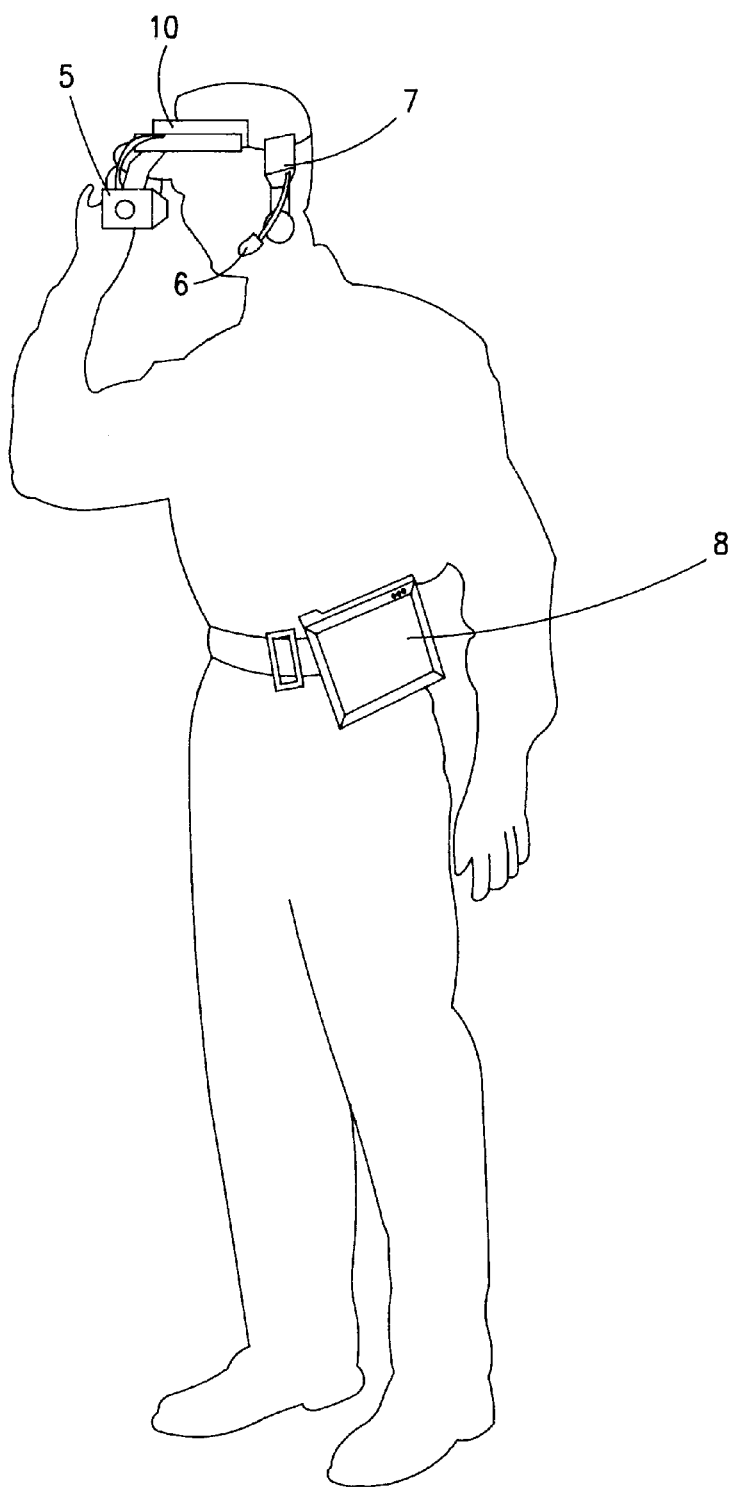
FIG. 3 is a plan view of the hands free type mobile computer that is used with the sensor containing display disclosed herein.
Figure 4:
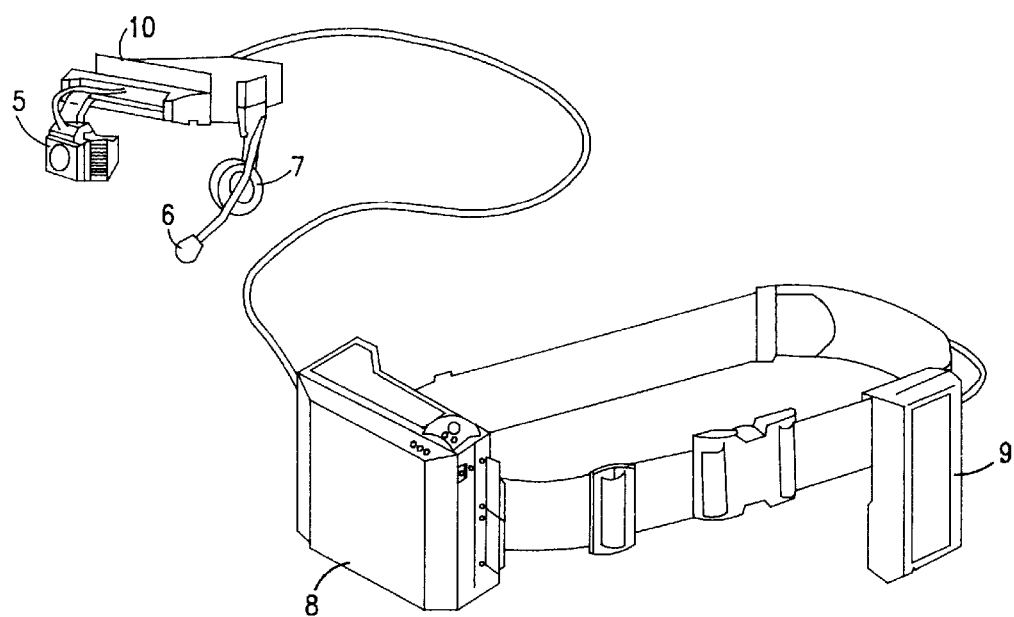
FIG. 4 is a perspective view showing the components of the hands free mobile computer of this invention.

The operator hardware input provides information on the computing device that is in use by the operator as shown in FIG. 3. It detects the type of output device, the software application in use and the reflectivity characteristics of the physical glass and coatings of the output device such as a flat panel display, a head mounted display, a body mounted or supported display, a neck hung display, a holographic display or mixtures thereof. The embedded database provides information on human circadian color recognition and time of day. The computer data processor 2 takes all the input data from the sensor 1 components A, B & C and calculates the optimal display setting and affects these settings on the display device 5 (as shown in FIGS. 3 and 4) with dynamic feedback and update capabilities. Since each MEMSDO sub-system A, B or C requires a microprocessor for carrying out its subsystems function, a more technically elegant design is the use one central microprocessor and only keep the specialized functions within the subcomponent. However, any suitable system may be used.

The information compiled by the data processor 2 is used to generate specific computer commands to the output device 4 with the purpose of optimizing the viewability for the operator in a dynamic manner. All of the above type sensors are available and sold for use in other types of equipment such as cameras, television, medical devices, automobiles and distance calculators. Also similar devices are used in the prior art above cited.

In FIG. 3 a user is illustrated using the mobile hands free computer system of this invention. The user is wearing a head mounted display structure means 10 containing a display 5, a microphone 6 and an earpiece 7; see FIG. 4 for specifics and enlarged view. The display 5 contains the sensor 1 or is electrically connected to a sensor 1 located at any location within the computer system. The user is wearing a computer processor 8 where the data processor 2, voice recognition means 3 and output device 4 are located. A full description of the voice recognition and functioning of this mobile computer is given in U.S. Pat. No. 5,305,244. The other hands free activation means other than audio are fully described in U.S. Pat. No. 5,844,824, both of which are incorporated by reference into the present disclosure. The processor 8 and the display means are either hardwire connected or wireless as described in U.S. Pat. Nos. 5,844,824 and 5,305,244. A full description of the voice recognition and functioning of this mobile computer is given in U.S. Pat. No. 5,305,244. The other hands free activation means other than audio are fully described in U.S. Pat. No. 5,844,824 both of which are incorporated by reference into the present disclosure. The processor 8 and the display means are either hardwire connected or wireless as described in U.S. Pat. Nos. 5,844,824 and U.S. Pat. No. 5,305,244. Power is supplied to the mobile computer by power battery or other means 9.

Any suitable display 5 other than the illustrated head mounted display may be used in the present invention provided it is user supported. Also since the display structure means 10 contains an earpiece 7 and a mouthpiece or microphone 6, it is used if desired as earlier noted as a communication or telephone means having wireless (or hardwire) capabilities. The processor 8 may be worn around the waist or torso, whatever is more convenient.

The preferred and optimumly preferred embodiments of the present invention have been described herein and shown in the accompanying drawings to illustrate the underlying principles of the invention but it is to be understood that numerous modifications and ramifications may be made without departing from the spirit and scope of this invention.

What is claimed is:

1. A hands free user or operator supported mobile computer system comprising hands free, activating means, a processor and a display means, said processor in electrical connection to said display means, said mobile computer comprising at least one sensor for optimizing internal settings in said display when said sensor and said display are in communication, means in said computer to receive information from said sensor and to transmit it to a data processing means, and means to translate said data into computer commands to effect control and alteration of said computer system to coincide with any changes resulting from input of said sensor wherein said sensor is enabled to at least measure conditions and optimize internal settings based upon environmental conditions and the type of the display means and reflectivity characteristics of a physical glass and coatings of the display means.

2. The mobile computer system of claim 1 wherein said sensor comprises means to measure conditions selected from the group consisting of ambient light, ambient temperature, ambient noise, distance of said display from the operator, time of day, optical magnification for corrected or uncorrected vision of said operator, optimum power setting for said computer and mixtures thereof.

3. The mobile computer system of claim 1 wherein said display means is selected from the group consisting of head mounted display, neck hung display, body supported display, flat panel display, wrist mounted display and mixtures thereof.

4. The mobile computer system of claim 1 wherein said sensor is located in said display means.

5. The mobile computer system of claim 1 wherein said hands free activation means is selected from the group consisting of audio activation means, eye-tracking activation means, electroencephalography activation means and mixtures thereof.

6. The mobile computer system of claim 1 wherein said computer comprises means for communicating and interacting with a communications means selected from the group consisting of cellular telephones, hardwire telephones, wireless telephones, infrared transceivers, two-way radio means and mixtures thereof.

7. The mobile computer system of claim 1 wherein said hands free activating means includes means for transmitting audio commands to a voice recognition module.

8. The mobile computer system of claim 1 wherein only said computer display means and said hands free activating means are worn by the user and said processor is unattached from the user and located at a remote location.

9. The mobile computer system of claim 1 wherein said processor, said display means and said activation means are combined into a single housing worn by said user.

10. A user supported mobile computer system comprising a processor and a display means, said processor in electrical connection to said display means, said mobile computer comprising at least one sensor for optimizing internal settings in said display when said sensor and said display are in communication, means in said computer to receive information from said sensor and to transmit it to a data processing means, and means to translate said data into computer commands to effect control and alteration of said computer system to coincide with any changes resulting from input of said sensor wherein said sensor is enabled to at least measure conditions and optimize internal settings based upon environment conditions the type of the display means and reflectivity characteristics of a physical glass and coatings of the display means.

11. The mobile computer system of claim 10 wherein said sensor comprises means to measure conditions selected from the group consisting of ambient light, ambient temperature, ambient noise, distance of said display from the operator, time of day, optical magnification for corrected or uncorrected vision of said operator, optimum power setting for said computer and mixtures thereof.

12. The mobile computer system of claim 10 wherein said display means is selected from the group consisting of head mounted display, neck hung display, body supported display, flat panel display, wrist mounted display and mixtures thereof.

13. The mobile computer system of claim 10 wherein said sensor is located in said display means.

14. The mobile computer system of claim 10 wherein said computer comprises means for communicating and interacting with a communications means selected from the group consisting of cellular telephones, hardwire telephones, wireless telephones, infrared transceivers, two-way radio means and mixtures thereof.

15. The mobile computer system of claim 10 wherein only said computer display means is worn by the user and said processor is unattached from the user and located at a remote location.

16. A user supported mobile computer system comprising a processor and display means, and hands-free activation means, said processor in electrical connection to said display means, said mobile computer comprising at least one sensor for optimizing internal settings in said display when said sensor and said display are in communication, means in said computer to receive information from said sensor and to transmit it to said processor, and means to translate said data into computer commands to effect control and alternation of said computer system to coincide with any changes resulting from input of said sensor wherein said sensor is enabled to at least measure conditions and optimize internal settings based upon environment conditions the type of the display means and reflectivity characteristics of a physical glass and coatings of the display means, said processor in electrical connection to said activation means to receive hands-free commands to operate said computer system and having means for issuing said commands located in said system physically apart from said processor.

17. The system of claim 16 wherein said hands-free activation means are audio activation means having an audio input device or microphone at a location in said system apart from said processor.

\* \* \* \* \*